(12) United States Patent
Wolforth et al.

(10) Patent No.: US 6,941,621 B1
(45) Date of Patent: Sep. 13, 2005

(54) BOAT SEAT RELEASE SYSTEM

(76) Inventors: Wayne P. Wolforth, 1811 Skyview La., Brookings, SD (US) 57006; Debra K. Wolforth, 1811 Skyview La., Brookings, SD (US) 57006

( * ) Notice: Subject to any disclaimer, the term of this patent is extended or adjusted under 35 U.S.C. 154(b) by 37 days.

(21) Appl. No.: 10/681,699

(22) Filed: Oct. 6, 2003

(51) Int. Cl.⁷ ................................................. F16B 7/04
(52) U.S. Cl. ...................... 24/270; 248/418; 248/534; 248/541; 114/363
(58) Field of Search ....................... 24/457, 270, 16 R; 285/312, 358, 242, 253; 297/378.1, 344.1; 248/503.1, 418, 501, 231.61, 241, 530, 534, 248/541; 114/363, 55, 57

(56) References Cited

U.S. PATENT DOCUMENTS

| | | | | |
|---|---|---|---|---|
| 249,766 | A | * 11/1881 | Hung | ......................... 285/358 |
| 2,304,343 | A | * 12/1942 | Diesbach | ..................... 24/270 |
| 3,991,968 | A | 11/1976 | Yazejian | ..................... 248/501 |
| 4,789,126 | A | 12/1988 | Rice et al. | ............... 248/503.1 |
| 4,928,620 | A | 5/1990 | Currey | ........................ 114/363 |
| 5,346,415 | A | 9/1994 | Waymon et al. | ............... 440/7 |
| 5,348,264 | A | 9/1994 | Few et al. | ............... 248/503.1 |
| 5,664,904 | A | * 9/1997 | Hapgood et al. | ........... 248/541 |
| 5,725,279 | A | 3/1998 | Ward et al. | .............. 297/378.1 |
| 5,775,251 | A | 7/1998 | Morningstar | ................ 114/363 |
| 5,826,532 | A | 10/1998 | Elvestad | ..................... 114/347 |
| 5,868,096 | A | 2/1999 | Elvestad | ..................... 114/347 |
| 5,921,696 | A | * 7/1999 | Gillotti | ........................ 24/270 |
| 6,022,077 | A | 2/2000 | Kirkland et al. | ....... 297/344.19 |
| 6,079,786 | A | 6/2000 | Kirkland et al. | ....... 297/344.24 |
| 6,082,680 | A | 7/2000 | Woodward et al. | ............ 248/1 |
| 6,116,183 | A | 9/2000 | Crow et al. | .................. 114/363 |
| 6,227,130 | B1 | 5/2001 | Tsumiyama et al. | ...... 114/55.57 |
| 6,279,864 | B1 | 8/2001 | Carnahan et al. | ........... 248/418 |
| 6,523,230 | B1 | * 2/2003 | Weinhold | ..................... 24/270 |

* cited by examiner

Primary Examiner—Robert J. Sandy

(57) ABSTRACT

A boat seat release system for assisting in the efficient and safe removal of a boat seat from a taper lock base. The boat seat release system includes a collar attachable to a pedestal and a pedal pivotally attached to the collar for selectively engaging a taper lock lever of a taper lock base to release the pedestal from base. The collar preferably has one or more rollers for engaging an upper surface of the base thereby simultaneously lifting the pedestal thereby breaking the frictional seal of the pedestal and the base.

19 Claims, 9 Drawing Sheets

BOAT SEAT RELEASE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to taper lock boat seats and more specifically it relates to a boat seat release system for assisting in the efficient and safe removal of a boat seat from a taper lock base.

2. Description of the Related Art

Taper lock boat seats have been in use for years. Taper lock boat seats are typically comprised of a taper lock base (12) having a taper lock lever (18) and a taper lock pedestal (14) that is catchably inserted into an opening within the taper lock base (12) as shown in FIGS. 1, 6, 7, 8 and 9 of the drawings. The taper lock base is mounted to a structure within the boat as shown in FIG. 1 of the drawings. The taper lock pedestal is frictionally retained within the taper lock base and locked in by the taper lock lever engaging an annular groove within a lower end of the taper lock pedestal as illustrated in FIG. 6 of the drawings.

Conventional taper lock boat seats are difficult and dangerous to release. The user has to simultaneously release the taper lock lever while lifting to break the seal of the taper lock pedestal within the taper lock base. When user's attempt to unlock and release a taper lock boat seat, they are susceptible to falling out of the boat or injury. Another problem with conventional taper lock boat seats is that they require significant amounts of physical exertion to remove the pedestal from the base. Another problem with conventional taper lock boat seats is that the pedestal may be difficult to remove from the base without the usage additional tools.

While these devices may be suitable for the particular purpose to which they address, they are not as suitable for assisting in the efficient and safe removal of a boat seat from a taper lock base. Conventional taper lock boat seats are difficult and unsafe to utilize when attempting to remove the pedestal from the base.

In these respects, the boat seat release system according to the present invention substantially departs from the conventional concepts and designs of the prior art, and in so doing provides an apparatus primarily developed for the purpose of assisting in the efficient and safe removal of a boat seat from a taper lock base.

BRIEF SUMMARY OF THE INVENTION

In view of the foregoing disadvantages inherent in the known types of taper lock boat seats now present in the prior art, the present invention provides a new boat seat release system construction wherein the same can be utilized for assisting in the efficient and safe removal of a boat seat from a taper lock base.

To attain this, the present invention generally comprises a collar attachable to a pedestal and a pedal pivotally attached to the collar for selectively engaging a taper lock lever of a taper lock base to release the pedestal from base. The collar preferably has one or more rollers for engaging an upper surface of the base thereby simultaneously lifting the pedestal thereby breaking the frictional seal of the pedestal and the base.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a boat seat release system that will overcome the shortcomings of the prior art devices.

A second object is to provide a boat seat release system for assisting in the efficient and safe removal of a boat seat from a taper lock base.

Another object is to provide a boat seat release system that does not require significant physical exertion to break the seal of a taper lock boat seat.

An additional object is to provide a boat seat release system that simultaneously unlocks and breaks the seal of a taper lock boat seat.

A further object is to provide a boat seat release system that reduces the likelihood of physical injury when removing a taper lock boat seat.

Another object is to provide a boat seat release system that may be utilized upon various sizes of taper lock pedestals.

A further object is to provide a boat seat release system that is easily attached to an existing or new taper lock pedestal.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
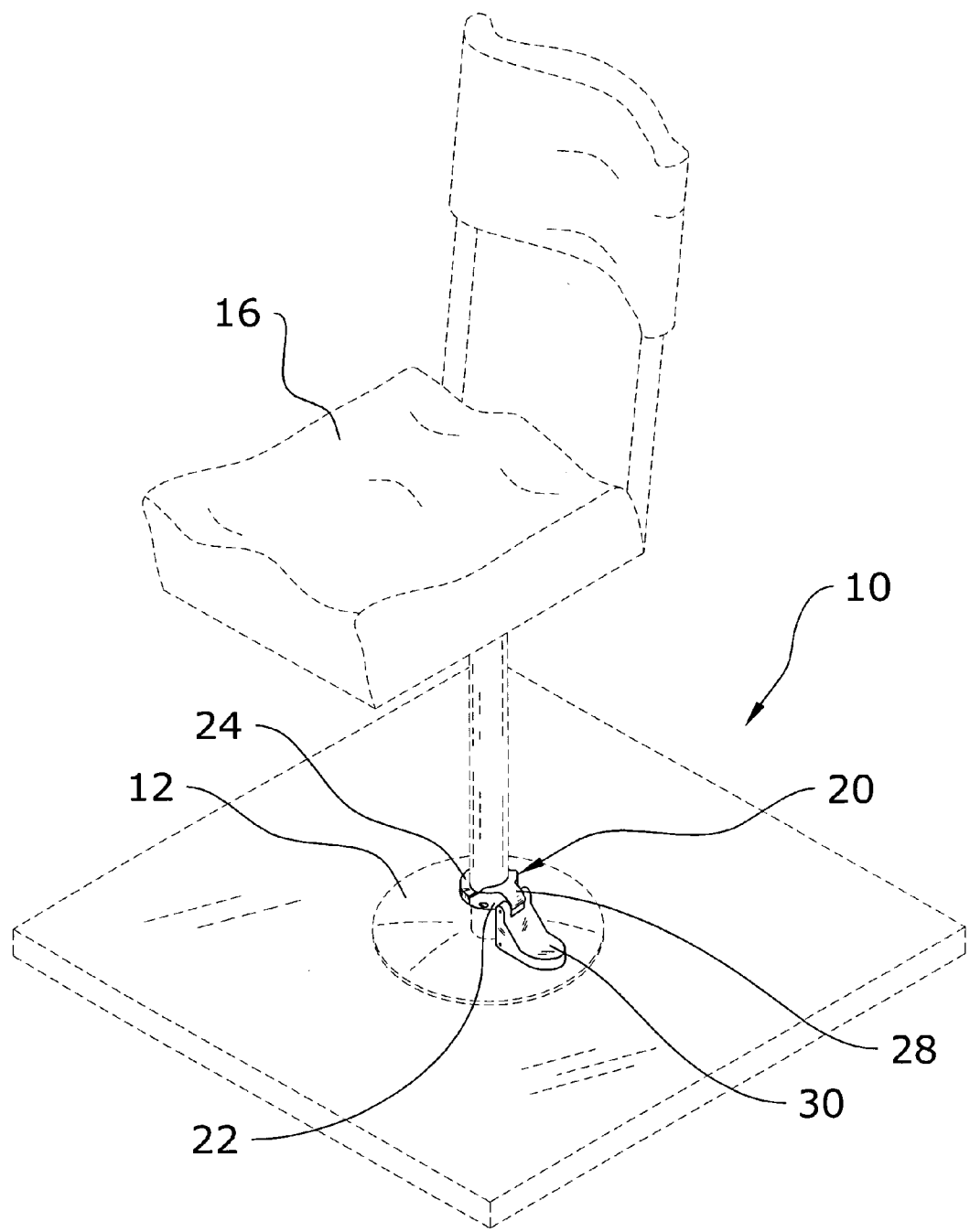
FIG. 1 is an upper perspective view of the present invention attached to a taper lock boat seat.
Figure 2:
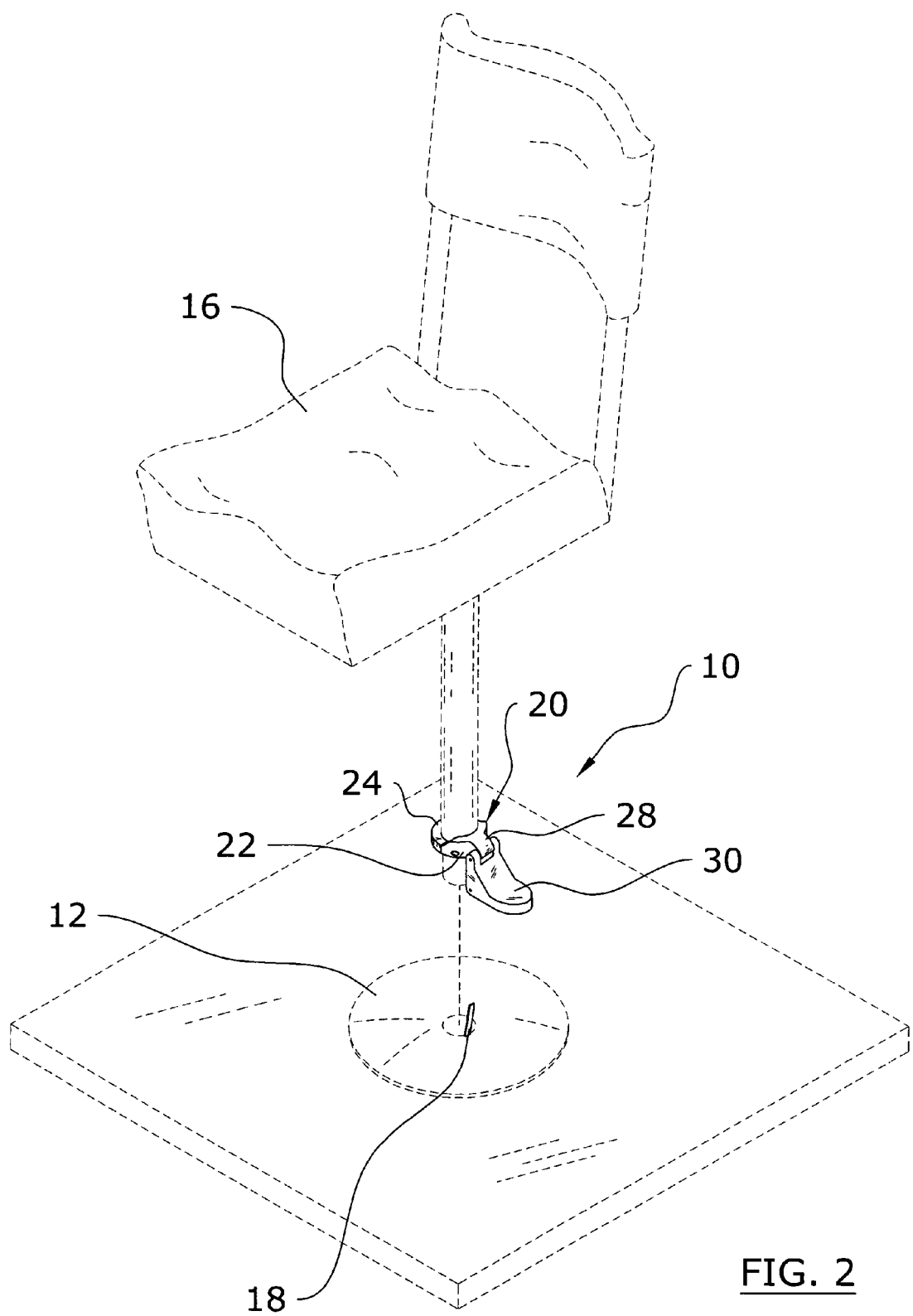
FIG. 2 is an upper perspective view of the present invention attached to a taper lock boat seat with the pedestal removed from the taper lock base.

Turning now descriptively to the drawings, in which similar reference characters denote similar elements throughout the several views, FIGS. 1 through 9 illustrate a boat seat release system 10, which comprises a collar 20 attachable to a pedestal 14 that supports a seat member 16 and a pedal 30 pivotally attached to the collar 20 for selectively engaging a taper lock lever 18 of a taper lock base 12 to release the pedestal 14 from base 12. The collar 20 preferably has one or more rollers 32 for engaging an upper surface 34 of the base 12 thereby simultaneously lifting the pedestal 14 thereby breaking the frictional seal of the pedestal 14 and the base 12.

B. Collar

Figure 3:
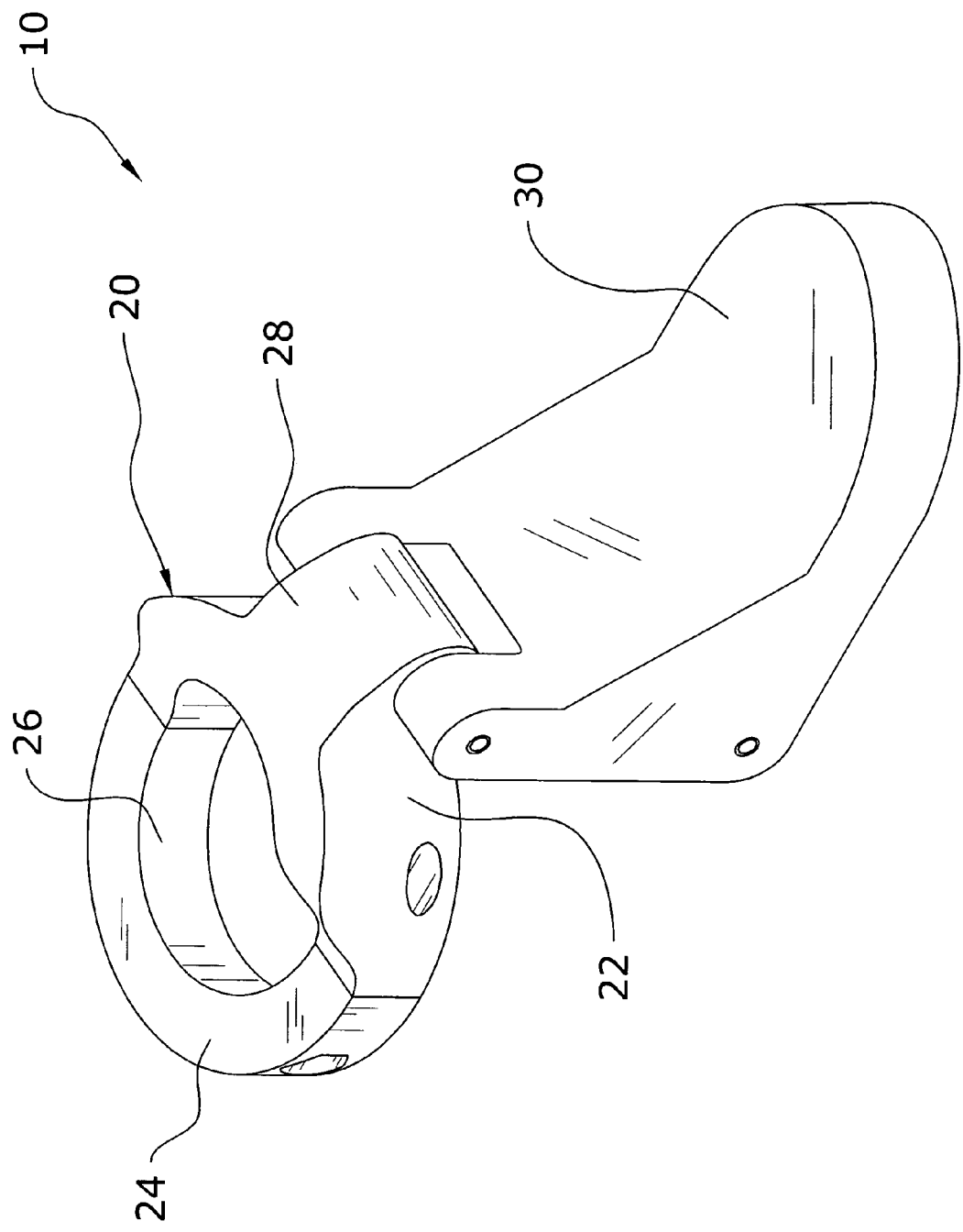
FIG. 3 is a rear upper perspective view of the present invention.
Figure 4:
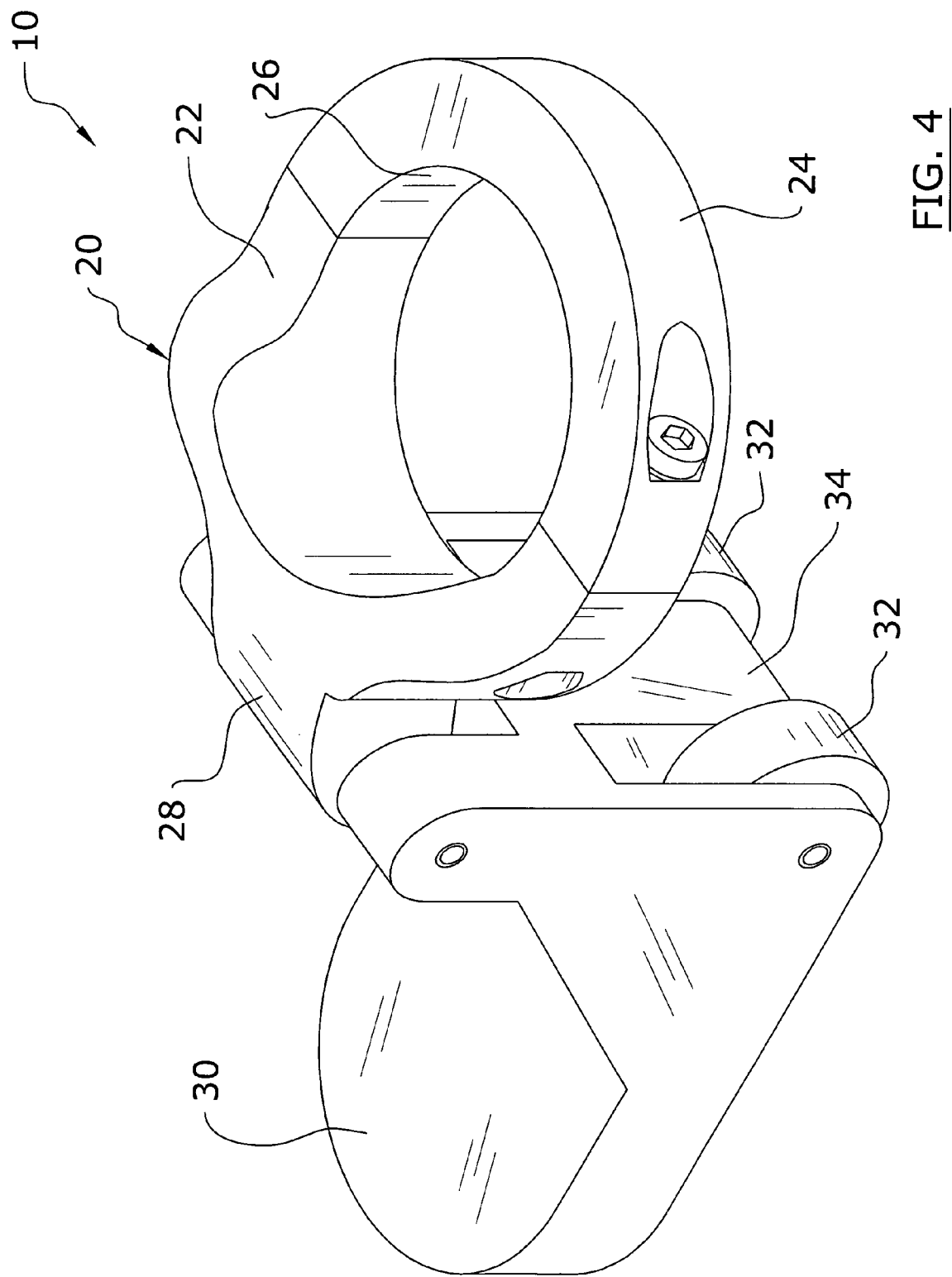
FIG. 4 is a front upper perspective view of the present invention.

The collar 20 has a receiver opening 26 for receiving a lower portion of a taper lock pedestal 14 as best shown in FIGS. 3 and 4 of the drawings. The receiver opening 26 has an inner diameter capable of receiving a taper lock pedestal 14 as illustrated in FIG. 1 of the drawings. The collar 20 is preferably removably attachable to a taper lock pedestal 14, however the collar 20 may be permanently attached to the taper lock pedestal 14.

Figure 5:
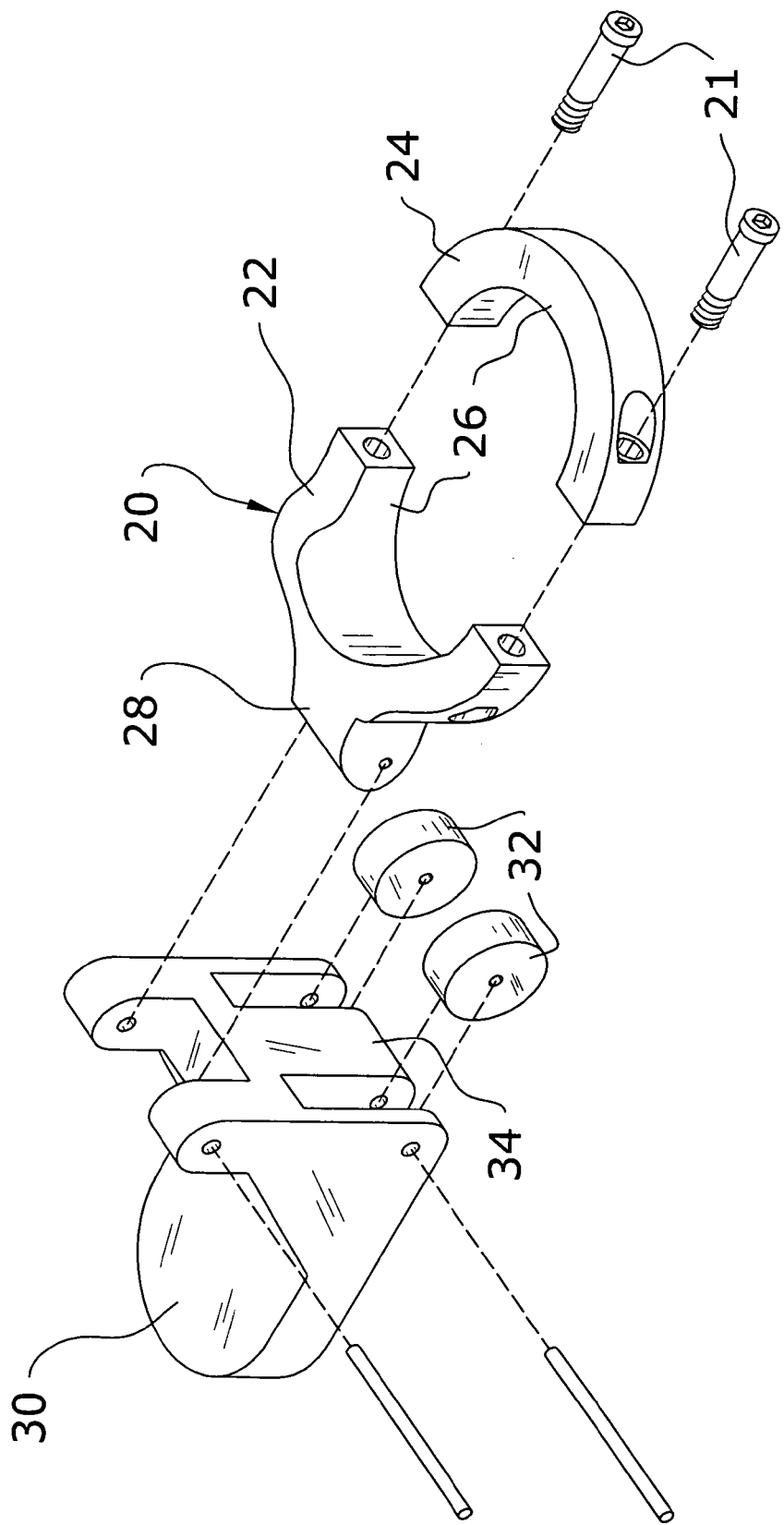
FIG. 5 is an exploded front upper perspective view of the present invention.
Figure 6:
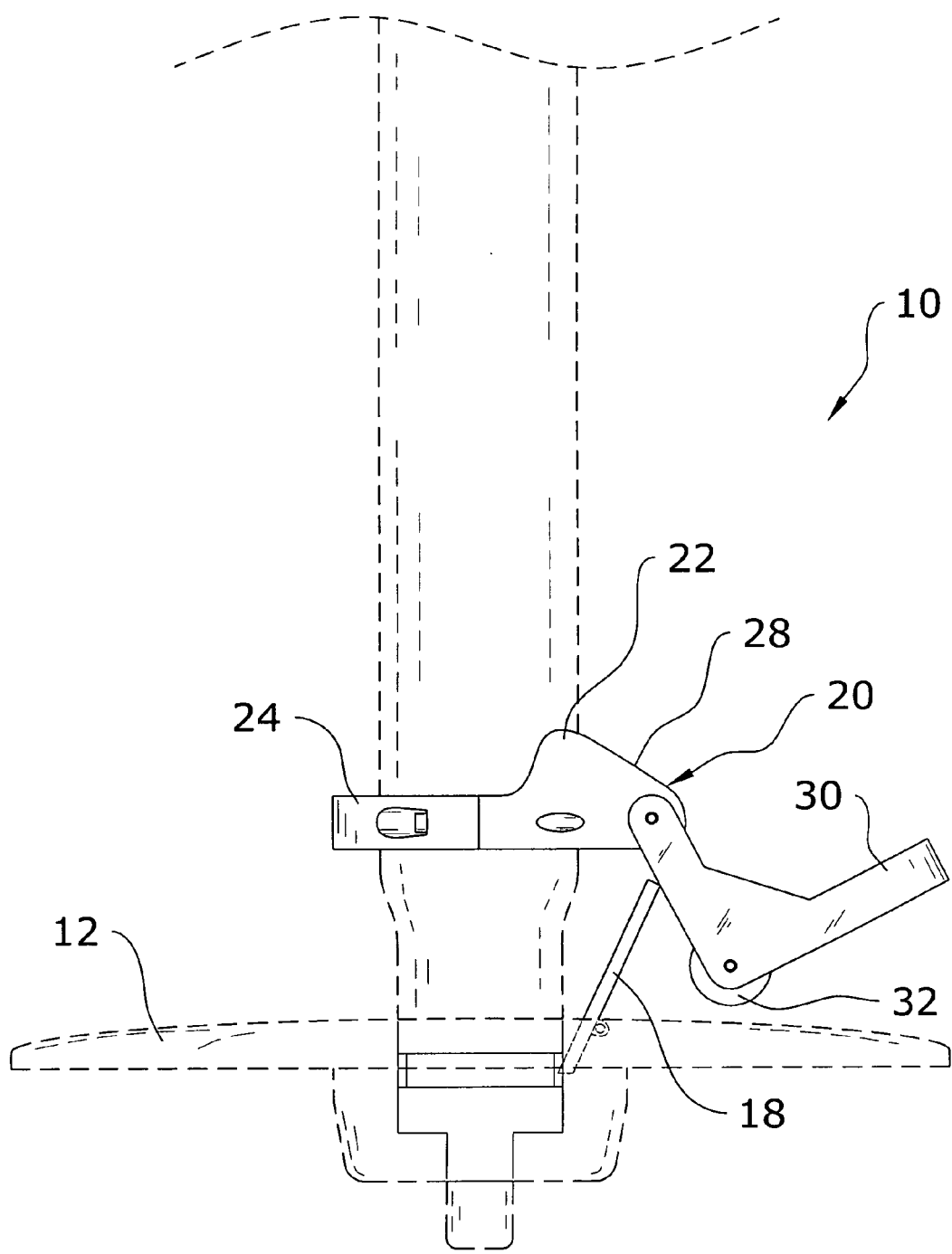
FIG. 6 is a side view of the present invention attached to the pedestal with the pedestal locked within the base.

The collar 20 may be comprised of a solid structure. However, the collar 20 preferably has a first segment 22 and a second segment 24 attachable to the first segment 22 about a taper lock pedestal 14 as best illustrated in FIG. 5 of the drawings. Conventional fasteners 21 or other securing means may be utilized to secure the first segment 22 and the second segment 24 together. The collar 20 is frictionally attached to the taper lock pedestal 14.

The first segment 22 and the second segment 24 form the receiver opening 26 for receiving a taper lock pedestal 14 as shown in FIGS. 3 and 4 of the drawings. The first segment 22 and the second segment 24 each form a semi-circular structure as best shown in FIG. 5, though other shapes may be utilized for the segments 22, 24. The first segment 22 preferably has a neck 28 that pivotally supports the pedal 30, however the pedal 30 may be directly connected to the body of the first segment 22.

C. Pedal

A pedal 30 is pivotally attached to the collar 20 for selectively engaging a taper lock lever 18 attached to a taper lock base 12 as illustrated in FIGS. 1 through 9 of the drawings. The pedal 30 preferably includes an engaging face 34 for engaging a taper lock lever 18 of a taper lock base 12 as shown in FIGS. 4 and 5 of the drawings. The pedal 30 has an extended portion that is engageable by a foot of a user wherein the extended portion may have various structures that are suitable for engagement as shown in FIGS. 3 through 5 of the drawings.

D. Operation

In use, the collar 20 is attached to a lower portion of the pedestal 14 as best illustrated in FIGS. 1 and 6 through 9 of the drawings. The collar 20 is positioned so that the engaging face 34 of the pedal 30 is able to engage a portion of the lever 18 when the collar 20 is pivoted downwardly.

Figure 7:
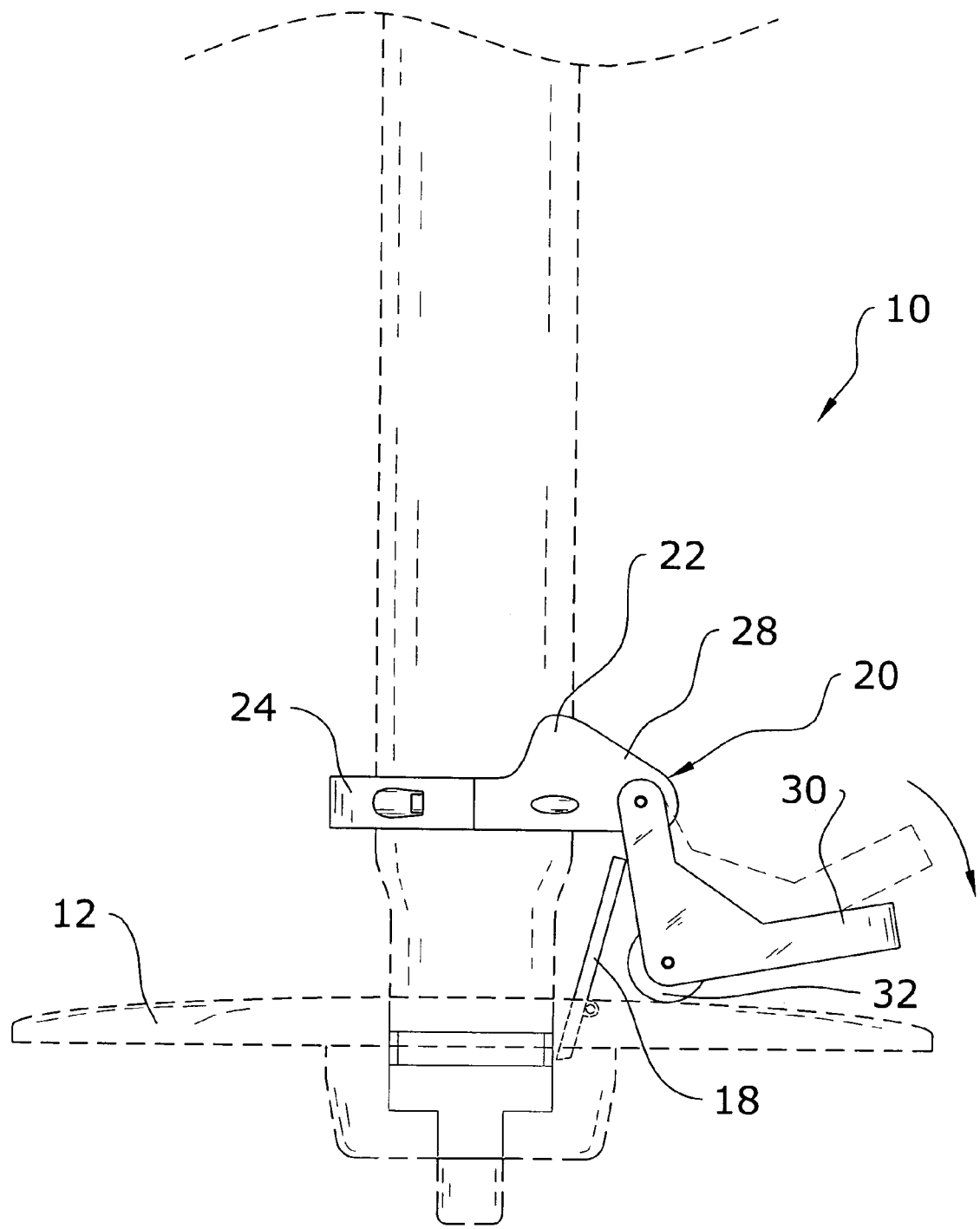
FIG. 7 is a side view of the present invention attached to the pedestal with the pedal pressed partially downwardly thereby engaging the taper lock lever and causing the taper lock lever to be in a release position.

To release the taper lock boat seat, the user applies a downward force to the pedal 30 as illustrated in FIG. 7 of the drawings. As shown in FIG. 7, as the user continues to pivot the pedal 30, the engaging face 34 of the pedal 30 engages the lever 18 and causes the lever 18 to first pivot within the base 12 into a release position (from a locked position shown in FIG. 6).

Figure 8:
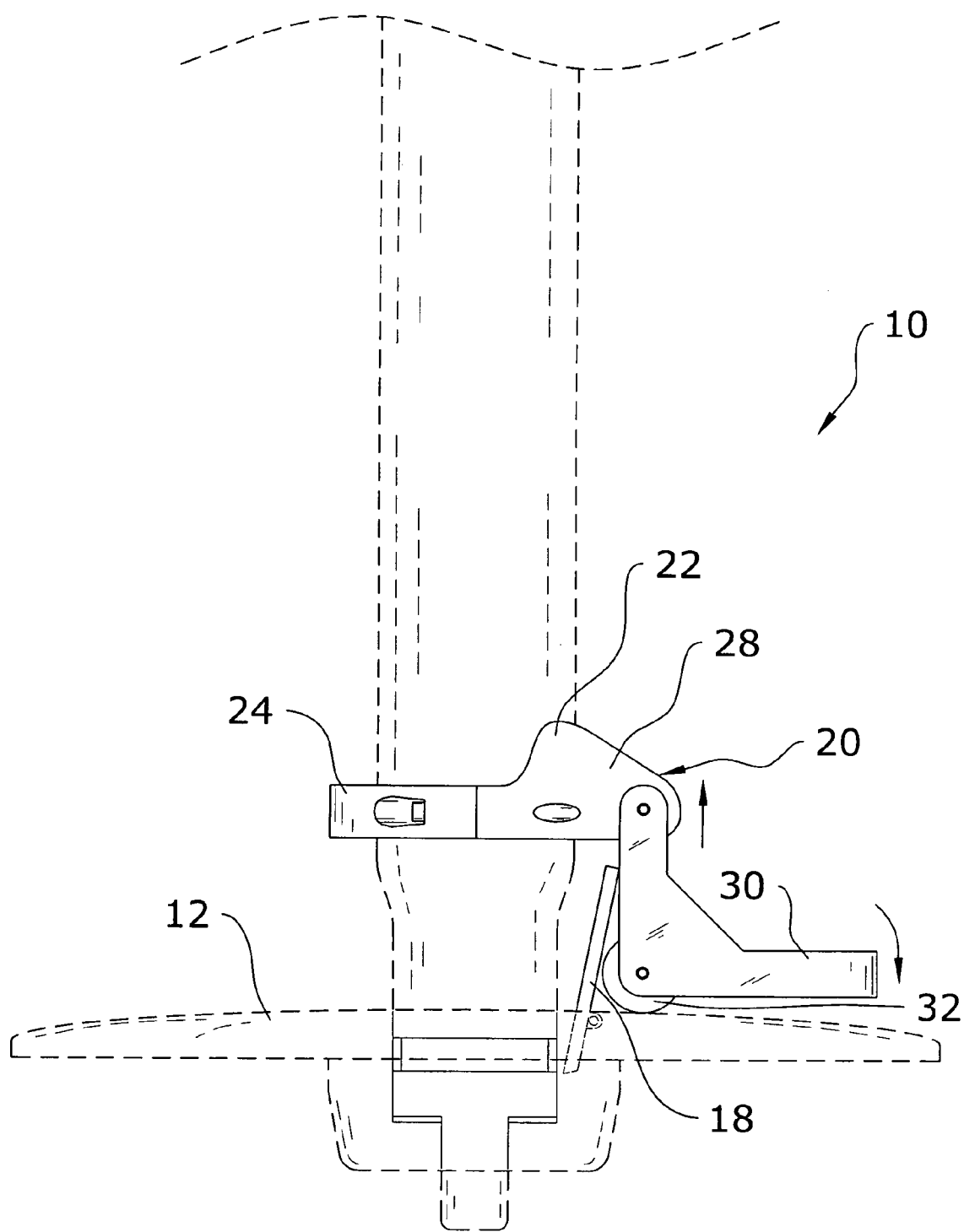
FIG. 8 is a side view of the present invention attached to the pedestal with the pedal pressed fully downwardly thereby causing the pedestal to be lifted upwardly from the base to break the frictional seal.
Figure 9:
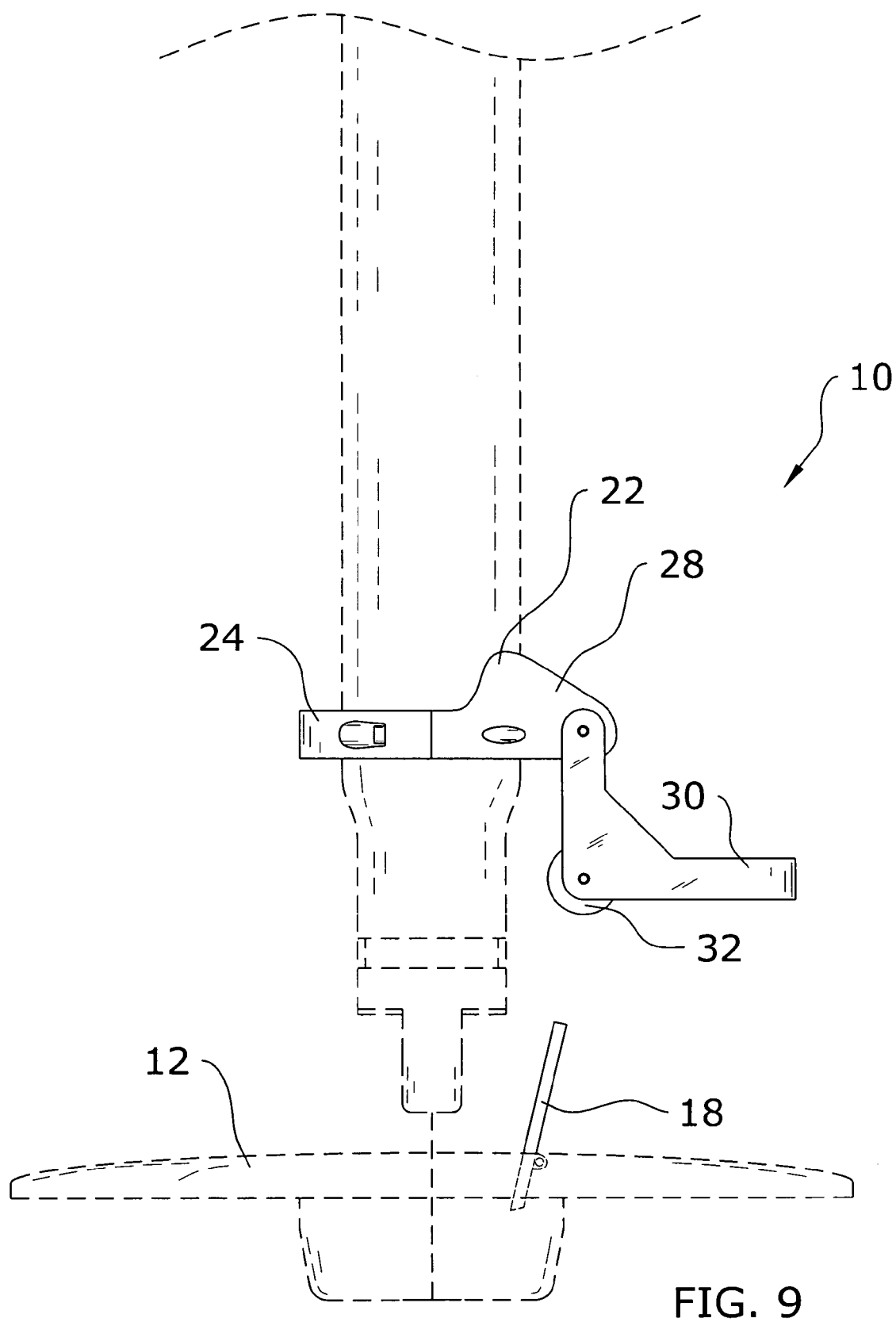
FIG. 9 is a side view of the present invention attached to the pedestal with the pedestal fully removed from the base.

When the lower portion of the pedal 30 or the wheels engage the upper surface 34 of the base 12, the pedal 30 applies an upward force to the collar 20 and the pedestal 14 as shown in FIG. 8 of the drawings. The upward force applied to the collar 20 and the pedestal 14 causes the frictional seal of the pedestal 14 and the base 12 to be broken. The upward force also lifts the pedestal 14 upwardly as shown in FIG. 8 of the drawings. After the pedestal 14 has been partially removed from the base 12 by the present invention, the user is then able to freely lift upon the seat member 16 and/or pedestal 14 to remove the pedestal 14 completely from the base 12 a shown in FIG. 9 of the drawings.

A lower portion of the pedal preferably engages the upper surface of the base to apply a lifting force to the pedestal when the pedal is pivoted downwardly as shown in FIG. 8 of the drawings. Also, one or more wheels may be attached to the lower and inner portion of the pedal for engaging the upper surface of the base for applying the lifting force to the collar when the pedal is pivoted downwardly. The wheels allow for relatively easy movement of the pedal along the upper surface of the base.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A boat seat release system for releasing a taper lock pedestal from a taper lock base, comprising:

a collar attachable to a taper lock pedestal; and a pedal pivotally attached to said collar for selectively engaging a taper lock lever attached to a taper lock base, wherein said pedal has a lower portion that engages an upper surface of a taper lock base when pivoted downwardly to apply a lifting force to said collar.

2. The boat seat release system of claim 1, wherein said collar has a receiver opening for receiving a taper lock pedestal.

3. The boat seat release system of claim 2, wherein said receiver opening has an inner diameter capable of receiving a taper lock pedestal.

4. The boat seat release system of claim 1, wherein said collar has a first segment pivotally supporting said pedal and a second segment attachable to said first segment about a taper lock pedestal.

5. The boat seat release system of claim 4, wherein said first segment and said second segment form a receiver opening for receiving a taper lock pedestal.

6. The boat seat release system of claim 4, wherein said first segment and said second segment each form a semi-circular structure.

7. The boat seat release system of claim 4, wherein said first segment has a neck that pivotally supports said pedal.

8. The boat seat release system of claim 1, wherein said pedal includes an engaging face for engaging a taper lock lever of a taper lock base.

9. The boat seat release system of claim 1, wherein said pedal has an extended portion that is engageable by a foot of a user.

10. A boat seat release system for releasing a taper lock pedestal from a taper lock base, comprising:

a collar attachable to a taper lock pedestal;

a pedal pivotally attached to said collar for selectively engaging a taper lock lever attached to a taper lock base; and one or more wheels attached to a lower and inner portion of said pedal for engaging an upper surface of a taper lock base for applying a lifting force to said collar when said pedal is pivoted downwardly.

11. The boat seat release system of claim 10, wherein said pedal has an extended portion that is engageable by a foot of a user.

12. The boat seat release system of claim 10, wherein said collar has a receiver opening for receiving a taper lock pedestal.

13. The boat seat release system of claim 12, wherein said receiver opening has an inner diameter capable of receiving a taper lock pedestal.

14. The boat seat release system of claim 10, wherein said collar has a first segment pivotally supporting said pedal and a second segment attachable to said first segment about a taper lock pedestal.

15. The boat seat release system of claim 14, wherein said first segment and said second segment form said receiver opening.

16. The boat seat release system of claim 14, wherein said first segment and said second segment each form a semi-circular structure.

17. The boat seat release system of claim 14, wherein said first segment has a neck that pivotally supports said pedal.

18. The boat seat release system of claim 10, wherein said pedal includes an engaging face for engaging a taper lock lever of a taper lock base.

19. A boat seat release system for releasing a taper lock pedestal from a taper lock base, comprising:

a collar having a receiver opening for receiving a taper lock pedestal, wherein said receiver opening has an inner diameter capable of receiving a taper lock pedestal;

a pedal pivotally attached to said collar for selectively engaging a taper lock lever attached to a taper lock base, wherein said pedal includes an engaging face for engaging a taper lock lever of a taper lock base and wherein said pedal has an extended portion that is engageable by a foot of a user;

one or more wheels attached to a lower and inner portion of said pedal for engaging an upper surface of a taper lock base for applying a lifting force to said collar when said pedal is pivoted downwardly;

wherein said collar has a first segment pivotally supporting said pedal and a second segment attachable to said first segment about a taper lock pedestal, wherein said first segment and said second segment form said receiver opening for receiving a taper lock pedestal, and wherein said first segment and said second segment each form a semi-circular structure; and wherein said first segment has a neck that pivotally supports said pedal.

\* \* \* \* \*